Patented Feb. 7, 1950

2,496,587

UNITED STATES PATENT OFFICE 2,496,587

PREPARATION OF CADMIUM SULFO-SELENIDE REACTANTS

Guy C. Marcot, Lynchburg, Va., assignor to American Cyanamid Company, New York, N. Y., a corporation of Maine No Drawing. Application June 28, 1946, Serial No. 680,098

3 Claims. (Cl. 106—301)

This invention relates to the production of cadmium red pigments and is concerned in particular with a novel method of making both old and new products.

As used in the present invention, the term "cadmium red pigments" is used to designate any of a variety of calcined products ranging in color from bright orange to a dark maroon and containing both CdS and CdSe. These components appear to form a solid solution in the finished pigment, constituting the principal colored constituent thereof. Control of the color shade is obtained by varying the relative proportions of CdS and CdSe in the solid solution, approximately as indicated in the following table:

TABLE I

| Shade | CdS:CdSe Ratio | |
|---|---|---|
| | Per Cent CdS | Per Cent CdSe |
| Orange | 70 | 30 |
| Light Red | 60 | 40 |
| Dark Red | 48 | 52 |
| Maroon | 41 | 59 |
| Deep Maroon | 35 | 65 |

While these proportions are known, various shades having been previously obtained by a number of proposed methods, these methods have not been wholly satisfactory and are subject to a number of procedural and economic disadvantages. Particularly is this true as to the production of the darker shades.

In addition to preparing these pigments as "pure" types, i. e., forms in which the solid solution is the principal constituent, they are also commonly prepared as "lithopone" or "extended" types. This is usually done by including a suitable amount of an inert "extender" such, for example, as BaSO$_4$, in the "crude" before calcination. These extenders may be incorporated in the crude in any desired manner, usually, however, by coprecipitation with one of the components thereof. The process of the present invention is readily adapted to the production of pigments of any of these types and its advantages apply equally in the manufacture of either pure or extended forms.

In the past, cadmium red pigments, such as those with which the present invention is concerned, have been obtained by combining a series of procedural steps, each in turn selected from various proposals, to produce a calcinable crude. Such procedures may be roughly divided into two general classifications; precipitation of the crude "compounds" of indefinite structure, usually designated as cadmium sulfo-selenides; and preparation of the components as a mechanical mixture.

The sulfo-selenide type of crude is usually obtained by dissolving selenium in a sodium or barium sulfide liquor and carrying out a strike of this liquor and a solution of a soluble cadmium salt. The resultant cadmium-bearing precipitate is used as the crude. In preparing the "mixture" type of crude, CdS is separately prepared and then combined, usually in a slurry, with a CdO reactant, which may be CdO per se or a compound reducible during calcination to CdO; and with an Se reactant, preferably elemental Se. In either type of preparation, some sulfur is also usually present in the crude.

In either case, the crude to be calcined, however prepared, is collected, dried if necessary, and finally calcined. At suitable temperatures, this results in conversion of at least part of the selenium and an equivalent amount of cadmium compound or compounds to CdSe. This reaction is accompanied by the concurrent liberation of sulfur dioxide and also, in previously-used processes, some free sulfur which is volatile and eliminated at the usual calcination temperatures of about 1000°–1400° F.

However, as noted above, the various procedures used in the past to prepare cadmium red pigments are all subject to certain difficulties. Perhaps the most common of these stem from the problem of replacing the sulfur in cadmium sulfide by the less active selenium. Much work has been done on this problem and the resulting proposals of methods for forcing the reaction in the desired direction have been highly varied. They range from the obvious and simple expedient of providing a large excess of the Se reactant or reactants to the complicated process of calcining in an atmosphere of volatilized Se. None however have proved wholly satisfactory.

So troublesome is the sulfur replacement reaction that in the past production of deeper shades than about medium to dark red was considered commercially impractical. The previously-used processes all are subject to objection in that regardless of the shade being produced they result in an excessive loss of Se, a critical economic factor. Further, they result in unreliable production, only with extreme difficulty, of the dark red through the maroon and deep maroon shades.

It is, therefore, the principal object of the present invention to develop a simple, reliably-controllable procedure of making cadmium red pigments in which the amount of available Se in the crude is more fully recovered, i. e., converted to CdSe, than was possible with previously used procedures. Such a process, in addition to its improved economy in production, should also make possible simple and reliable formation of those darker shades necessitating the higher CdSe contents.

In general, accomplishment of these desired objects is simply and readily obtained by compounding the Se and CdO ingredients in the crude in the novel molar proportions of 3:2. In addition, free sulfur is neither included in the crude nor allowed to form during calcination.

In accordance with the present invention, it has been found primarily important in obtaining the desired results that the crude contain Se and CdO in controlled proportions of 3:2. A consideration of the Se:CdO ratio as a control factor is not wholly new with the present invention. Perhaps, the best of the previously-developed considerations in this respect are presented in U. S. Patent No. 2,134,055 to W. F. Meister, wherein the optimum conditions are considered to be found when the Se:CdO ratio is 2:1. The 3:2 ratio of the present invention has been considered to be within the range of proportions which are either impractical or impossible to use. It is quite surprising, therefore, that the novel proportions of the present process are so successful in practice.

A secondary, but far from negligible, factor in obtaining the desirable results of the present invention lies in the novel procedure of eliminating as far as possible the presence of free sulfur, either in the crude before calcination or liberated during calcination. In the previously used processes, varying quantities of free sulfur have been present during calcination. Opinions as to its presence have varied from its being a necessary but harmless diluent to its being both desirable and advantageous. In some cases it has been deliberately added. Consequently it is quite surprising that in the present invention it has been found that free sulfur present during calcination is not only unnecessary but actually deleterious. Its presence results not only in the production of inferior pigments but interferes to a large extent with the effective conversion of the available Se to CdSe.

As noted above, a number of procedures for producing the mixture of ingredients that constitutes the crude are known. It is an advantage of the process of the present invention that any of them may be used if so desired. However, care must be taken, whatever the process that is used, that it be controlled to produce the desired Se:CdO ratio and preferably also that it be controlled to eliminate free sulfur.

In order to insure this control it was found in developing the present invention that a process in which the desired components are individually prepared and then mechanically admixed or combined before calcination is to be preferred. This practice appears to allow simpler and more reliable control of the formulation. Accordingly, while the present invention is not necessarily limited thereto, it will be discussed as illustrated by this procedure.

The essential components of a "mixture" type of crude are the CdS reactant; the CdO reactant, preferably in the form of $CdCO_3$; and the Se reactant; preferably as elemental selenium. The preparation and use of these reactants may be illustrated in the following manner:

THE CdS REACTANT

A CdS reactant, containing the extender material, is usually prepared by a strike of a solution of a soluble cadmium salt, preferably $CdSO_4$, with a BaS liquor. This results in the precipitation of CdS, and, where $CdSO_4$ is used, the coprecipitation of an equivalent amount of $BaSO_4$. Sufficient BaS should be used to insure complete precipitation of the cadmium. Subsequently, the total amount of extender may be adjusted as desired by the addition of the requisite amount of separately prepared $BaSO_4$. In preparing a "pure" type, the BaS may be replaced by an alkali metal sulfide to form a soluble sulfate which is washed out.

Although not a part of the instant invention, it usually is desirable that a small quantity of an anti-fluxing agent be present in the crude, as is set forth more fully in my copending application, Serial No. 680,100, filed of even date. This agent may be conveniently added either before or after adjusting the extender content. The anti-fluxing agent is preferably, but not necessarily, an insoluble orthophosphate such as that of barium or aluminum. It may be formed readily in situ by adding $H_3PO_4$ which is converted to the phosphate by barium ions already present in solution or by a reactant such as aluminum sulfate specifically added for the purpose. Use of 0.2–0.5% is a good general procedure. The solids content of the slurry, which may be washed if so desired, for the purposes of the present process, is not collected.

THE CdO REACTANT

As noted above the CdO content of the crude either may be added per se or as a compound readily converted to CdO during calcination. Cadmium oxide itself may be quite readily prepared, for example by reacting a solution of a cadmium salt, usually the sulfate, with about two mol equivalents of sodium hydroxide, collecting, washing and, if necessary, drying the precipitate. Actual practice, however, shows that ading the CdO reactant as a material such as $CdCO_3$, which is easily converted to CdO during calcination, is preferable. The material so used is herein referred to as the CdO reactant regardless of its actual composition.

A $CdCO_3$ slurry may be prepared by a strike of a solution of a cadmium salt, such as the sulfate, with a solution containing about a molecular equivalent of an alkali carbonate or about two mols of an alkali bicarbonate. In accordance with the present invention it has been found that the latter produces a $CdCO_3$ which when used in the composite results in a more desirable final pigment. A slight excess, usually about 0.1 mol per mol of bicarbonate, is helpful but not essential. A batch strike by either adding the bicarbonate to the cadmium salt or by adding the cadmium salt to the bicarbonate is definitely preferable over a simultaneous strike preparation. The simultaneous strike does not produce as crystalline a product as the batch strike. Further, the simultaneous strike appears to give a somewhat larger content of combined sulfate, probably present as a basic sulfate of cadmium.

Because of their fluxing effect, the presence of excessive amounts of soluble salts in the crude may produce an adverse effect during calcination. Therefore the cadmium carbonate precipitate should be washed, preferably as much as the dispersive nature of the precipitate will allow, to reduce this salt content. A good practice is to continue washing until the residual soluble salt content is reduced to about 0.5% or less of the initial content. Washing below this point is usually physically impractical, at least when washing by the decantation procedure.

THE Se REACTANT

The Se reactant is also prepared in the form of a slurry. Preferably, elemental selenium, as finely divided as possible, is slurried with water to a thick pulp, usually about 50-70% solids. Because powdered selenium is not readily wetted, the usual practice in the past has been to mill it with one of the other reactants. However, as shown in my copending application, Serial No. 680,101, filed of even date, it is preferable to form a separate slurry by using a suitable wetting agent. This may be any of several materials. However, since organic matter and/or soluble alkali metal salts are undesirable in the crude, the preferred wetting agent is BaS. To prevent sulfur formation during calcination, an excess of the latter should be avoided. In general practice, slurrying the powdered selenium in about a 0.5% aqueous solution of BaS produces good results.

FORMULATING THE CRUDE

In preparing the composite, it is perhaps preferable that the Se slurry be added to the CdS slurry and then the $CdCO_3$ slurry added thereto. However, the exact sequence may be varied if so desired. The combined slurries are thoroughly agitated to produce as intimate an admixture as possible. Subsequently the solids content of the mixed slurries is dewatered, washed if so desired, and dried. This dried product constitutes the calcinable crude.

Some of the entrained or entrapped soluble salts in the $CdCO_3$ slurry will be present in the combined slurry. As shown in my previously-identified copending application, a part of this salts content is released when the slurries are admixed. The released salts may and should be washed out. The remaining soluble salts content may be made to serve as a fluxing material during calcination.

However, the residual amount of soluble salts in the mixed slurries is indefinite. Usually it exceeds that desired for fluxing purposes. In any case, their fluxing effect cannot be too reliably predicted. It is for this reason that, as was noted above, an anti-fluxing agent is preferably added to the CdS slurry during preparation thereof. Where this has been done, the resultant crude normally will be deficient in fluxing materials. The latter can be added in controlled amounts to the crude before drying and calcination, to give a predetermined optimum fluxing effect. Any soluble compatible salts such as sodium and/or potassium sulfate, may be used. Amounts required will range from about 0.15-0.35% of the solids weight. Use of about 0.3% is a good general practice.

CALCINATION

Finally the crude is calcined to produce the finished pigment. Contrary to some of the discussions in the prior art, if the above procedure is properly carried out to produce the correct Se:CdO ratio in the crude, no particular precautions are required during calcination other than to maintain an inert or neutral atmosphere. Calcination may be carried out in any suitable furnace. It is generally preferable, however, to use a muffle type. The temperatures employed will vary somewhat in accordance with the actual proportions of materials used and the presence or absence of fluxing agents. In general I have found that temperatures ranging from about 1000°–1400° F. are suitable, calcination being continued for sufficient time to insure substantially complete reaction. It should be noted that these temperatures are those of the pigments themselves during calcination. When using a muffle furnace, for example, the gas temperatures may be some 200°–400° F. higher.

The invention will be described and illustrated more fully in conjunction with the following examples in each of which the various reactants are prepared and treated in accordance with the foregoing discussion. The examples, however, are varied as to the Se:CdO ratios in the crude in order to show the effect thereof both on the color or mass tone values and on the efficiency of conversion of the available Se. Where in these examples a $CdSO_4$ liquor is referred to, a 36° Bé. solution is used and the BaS liquor is about a 17° Bé. solution. Except as noted, all parts are by weight.

EXAMPLE 1

Se:CdO ratio of 4:1

A CdS reactant was prepared by reacting 59.7 parts of $CdSO_4$ liquor and 50 parts of BaS liquor. Finally, about 0.22 part of $H_3PO_4$ and a sufficient quantity of $BaSO_4$, about 24 parts, to produce a total content of about 91 parts of blanc fixe were added. For the CdO reactant 10.8 parts of $CdSO_4$ was added batch-wise to about 9.1 parts of a 10% aqueous solution of $NaHCO_3$, this being equivalent to about 2.1 mols of the $NaHCO_3$ per mol of $CdSO_4$. A Se slurry was prepared by pulping 16.5 parts of Se powder to about 50% solids with a 0.5% BaS solution. The Se slurry was added to the CdS slurry and finally the $CdCO_3$ slurry added thereto. The whole was thoroughly admixed, dewatered, dried and calcined for about 10 minutes over a temperature ranging from an initial 1150° F. to a final 1350° F. The resulting pigment was found to possess a mass tone of excellent quality and a depth which was substantially a color match for a standard dark red cadmium red pigment.

From the foregoing it is apparent that the CdO:Se ratio of 1:4 was adjusted so that the production of CdSe would appear to follow the reaction:

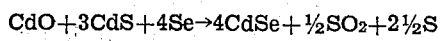

$$CdO + 3CdS + 4Se \rightarrow 4CdSe + \tfrac{1}{2}SO_2 + 2\tfrac{1}{2}S$$

and in addition was calculated to produce a Cd:Se weight ratio in the final product of 43.4:56.6. Analysis of the calcined pigment indicated that whereas the Se:Cd ratio as formulated was 0.434, the actual content was only in the ratio of 0.329. Therefore, the conversion of Se to CdSe is only 76%. This accounts for the fact that the color match approximates the dark red standard rather than the darker shade that would be anticipated from the formulated Cd:Se content of 0.434.

EXAMPLE 2

Se:CdO ratio of 2:1

Example 1 was repeated with the exception that 21.6 parts of $CdSO_4$ liquor and 18.2 parts of $NaHCO_3$ as a 10% solution were used in preparing the $CdCO_3$ slurry. The final calcined pigment possessed a mass tone of excellent quality of a dark red shade.

The proportions are calculated to give a Cd:Se weight ratio in the final pigment of 37.7:62.3 wherein the CdSe formation would follow the reaction $$2CdO + 2CdS + 4Se \rightarrow 4CdSe + SO_2 + S$$

These are the proportions indicated as optimum in U. S. Patent 2,134,055. Analysis of the calcined pigment, however, indicated a Se:Cd ratio of 0.324 whereas the ratio as formulated was 0.377. Accordingly the Se conversion to CdSe was only 86%.

EXAMPLE 3

Se:CdO ratio of 3:2

In order to illustrate the preferred CdO:Se ratio of the present invention, Example 1 was repeated using the following ingredients: (a) for the CdS lithopone preparation—52.3 parts of CdSO₄ liquor, 44 parts of BaS liquor and 32 parts BaSO₄; (b) for the CdCO₃ preparation—29.0 parts of CdSO₄ liquor and 24.3 parts of NaHCO₃ as a 10% aqueous solution; and (c) for the Se slurry—16.5 parts of Se powder. Calcination was carried out for about 12 minutes from an initial temperature of 1150° F. to a final 1350° F. The calcined pigment possessed a mass tone of excellent quality, in depth a deep maroon shade.

It will be seen that the proportions used in this test are intended to produce a Se:Cd weight ratio in the final product of 37.7:62.3 and that the CdSe formation will follow the reaction $$2CdO + CdS + 3Se \rightarrow 3CdSe + SO_2$$

from which equation it will be seen that no free sulfur is present or formed during calcination and that the volume of gas produced per unit of CdSe formed is minimized. Analysis of the pigment indicated a Se:Cd ratio of 0.365 as compared with the formulated ratio of 0.377. This corresponds to the highly satisfactory Se conversion of about 97%.

From the foregoing examples it will be seen that an excess of Se in the crude is not deleterious so far as shade and mass tone is concerned. The principal defect in using an Se:CdO ratio greater than 3:2 is an economic one. The depth of shade produced is not consistent with the selenium consumption. With the correct ratio of 3:2 conversion of Se to CdSe is almost complete.

EXAMPLE 4

Se:CdO ratio of 4:3

In order to show the effect of still further decreasing the Se:CdO ratio, i. e., a departure from the optimum in using an excess of the CdO reactant, Example 1 was repeated using the following ingredients; (a) for the CdS lithopone preparation—CdSO₄, 48.9 parts as a 36° Bé. liquor, (b) BaS—41 parts as a 17° Bé. liquor, and (c) BaSO₄—sufficient to give a total of 91 parts (36 parts added), (d) in the CdCO₃ preparation—CdSO₄, 32.4 parts as a 36° Bé. liquor and NaHCO₃, 27.3 parts as a 10% solution, (e) in the Se slurry preparation—Se powder 16.5 parts, sulfur 1.7 parts. The dried crude was calcined over 10 minutes from an initial temperature of 1100° F. to a final temperature of 1300° F. The final pigment possessed a mass tone with a depth of a light maroon shade but the qaulity was only fair due to a slight brown cast.

The ingredient proportions are calculated to give a Se:Cd weight ratio of 37.7:62.3 in the final product wherein the CdSe formation would follow the following reaction:

$$S + 3CdO + CdS + 4Se \rightarrow 4CdSe + 1\tfrac{1}{2}SO_2 + \tfrac{1}{2}S$$

Analysis of the product exhibited a Se:Cd ratio of 0.339 rather than the formulated 0.377. The conversion of Se was therefore only 90%.

EXAMPLE 5

Se:CdO ratio of 1:1

In order to further illustrate the effect of a still greater divergence from the optimum in the amount of excess CdO in the crude, Example 1 was repeated using the following ingredients: (a) in the CdS lithopone preparation—CdSO₄, 38.1 parts as a 36° Bé. liquor; BaS, 32 parts as a 17° Bé. liquor; BaSO₄—47 parts to give a total of 91 parts; (b) in the CdCO₃ preparation—CdSO₄, 43.2 parts as a 36° Bé. liquor; NaHCO₃, 36.4 parts as a 10% solution; (c) in the Se slurry preparation—Se powder, 16.4 parts; S, 3.4 parts. The dried crude was calcined for 10 minutes from an initial temperature of 1100° F. to a final temperature of 1300° F.

Ingredient proportions were calculated to give a Se:Cd weight ratio of 37.7:62.3 in the final product, wherein the CdSe formation would follow the reaction $$2S + 4CdO + 4Se \rightarrow 4CdSe + 2SO_2$$

Analysis of the product exhibited a Se:Cd ratio of 0.347 rather than the formulated 0.377. This corresponds to a Se conversion of 92% which is good. The pigment quality, however, was poor, possessing a brownish tinge and being deficient to standard.

From the foregoing examples it will be seen that the presence of an excessive amount of CdO in the crude has a somewhat different effect than excess Se. Unlike the latter it does not produce an excessive loss of Se. It does, however, result in pigments of poor quality mass tone and usually deficient in tint tone.

EXAMPLE 6

Se:CdO ratio of 1:1 with excess S

In order to show the deleterious effect of free sulfur, Example 5 was repeated except that prior to calcination approximately 100 parts of the dried crude was dry-blended with 2 parts of sulfur. This quantity of excess sulfur is equivalent to an ingredients formulation for Cd:Se formation according to the following:

$$4S + 4CdO + 4Se \rightarrow 4CdSe + 2SO_2 + 2S$$

The final pigment possessed a mass tone with a depth equivalent only to a dark red shade rather than the deep maroon which should be produced by efficient conversion of the amount of Se used. In addition the quality was very poor due to a pronounced dark brown cast.

The effect of the excess sulfur inclusion prior to calcination appears to be to lighten the mass tone without improving the quality, further indicating that the quality obtainable is largely controlled by the correct Se:CdO ratio formulated prior to calcination. Still further, analysis of the calcined pigment indicated a Se:Cd ratio of only 0.289 rather than the formulated 0.377, corresponding, therefore, to a Se conversion of only 77%. The presence of excess sulfur is therefore, as indicated by the prior examples, shown to be a very major factor in determining the extent of the Se recovery.

While the foregoing examples have been concerned with the production of lithopone or extended types of pigments, as noted above the invention is not limited thereto. Its application to the production of pure type pigments is shown in the following example.

EXAMPLE 7

Pure type pigment—Maroon shade 279 parts of CdS, prepared by a simultaneous strike of 2.35 molar $CdSO_4$ liquor and 1.0 molar $Na_2S$ liquor and washing the resultant precipitate was slurried in 2000 parts of water and 2.8 parts of $H_3PO_4$ and an equivalent amount of $Al_2(SO_4)_3$ was added thereto. 177 parts of $CdCO_3$, prepared by a strike of 1.76 molar $CdSO_4$ liquor with 1.2 molar solution of $NaHCO_3$ was slurried in 1200 parts of water. 123 parts of Se powder was made up into an approximately 50% pulp in 0.5% aqueous BaS liquor. These slurries were combined and adjusted to a total volume of about 3500 parts. A sample of the solids content indicated the soluble salts content of about 0.2%. This was adjusted by the addition of aqueous $Na_2SO_4$ to about 1.0% and the slurry dewatered and dried. The dried crude on calcination over 10 minutes from an initial 1200° F. to a final 1350° F. produced a pigment of excellent mass tone and a depth of shade equivalent to a maroon standard.

The effectiveness of the practice of the present invention in utilizing the Se content of the crude may be clearly summarized by a comparison of the Se consumption using the Se:CdO ratio of 2:1, which is the best practice of the previously-used processes, as set forth in U. S. Patent 2,134,055 with the Se consumption in producing the same color shades using the Se:CdO ratio of 3:2 of the present invention. This comparison is set forth in the following table:

Table II

| Shade | Parts Cd | Parts Se Required | | Per Cent Savings in Se |
| --- | --- | --- | --- | --- |
| | | 2:1 method [1] | 3:2 method [1] | |
| Orange | 100 | 20.0 | 18.4 | 8 |
| Light Red | 100 | 26.1 | 22.9 | 12 |
| Red | 100 | 32.1 | 27.5 | 14 |
| Dark Red | 100 | 37.6 | 31.7 | 16 |
| Maroon | 100 | 49.4 | 36.7 | 26 |

[1] Mol ratio of CdO: Se used in formulating crude.

The savings become more pronounced in producing the darker shades which is a definite advantage of the present invention in addition to the fact that the darker shades can be readily and reliably produced.

I claim:

1. In making cadmium red pigments, the method of improving the selenium conversion and color values which comprises, forming a calcinable composite comprising an admixture of cadmium sulfide, metallic selenium and a cadmium oxide reactant, said reactant being selected from the group consisting of cadmium oxide and compounds yielding cadmium oxide under calcination conditions, said composite being free from uncombined sulfur and having a mol ratio of metallic selenium:cadmium oxide of 3:2 and a cadmium sulfide:metallic selenium ratio of at least 1:3 whereby liberation of free sulfur during calcination is prevented, and calcining said composite.

2. In making cadmium red pigments, the method of improving the selenium conversion and color values which comprises, forming a calcinable composite comprising an admixture of cadmium sulfide, metallic selenium and cadmium carbonate, said composite being free from uncombined sulfur and having a mol ratio of metallic selenium:cadmium oxide of 3:2 and a cadmium sulfide:metallic selenium ratio of and at least 1:3 whereby liberation of free sulfur during calcination is prevented, and calcining the composite.

3. A process according to claim 2 in which the cadmium carbonate is prepared by a batch strike of a cadmium sulfate solution and a solution of an alkali metal bicarbonate.

GUY C. MARCOT.

REFERENCES CITED

The following references are of record in the file of this patent:

UNITED STATES PATENTS

| Number | Name | Date |
| --- | --- | --- |
| 2,115,080 | O'Brien | Apr. 26, 1938 |
| 2,248,408 | Juredine | July 8, 1941 |